US008768495B2

(12) United States Patent
Selby et al.

(10) Patent No.: US 8,768,495 B2
(45) Date of Patent: Jul. 1, 2014

(54) SYSTEM AND METHOD FOR MEDIA RECOGNITION

(75) Inventors: Alexander Paul Selby, Cambridge (GB); Mark St John Owen, Cambridge (GB)

(73) Assignee: Adelphoi Limited (GB)

( * ) Notice: Subject to any disclaimer, the term of this patent is extended or adjusted under 35 U.S.C. 154(b) by 626 days.

(21) Appl. No.: 13/151,365

(22) Filed: Jun. 2, 2011

(65) Prior Publication Data

US 2011/0307085 A1 Dec. 15, 2011

Related U.S. Application Data

(60) Provisional application No. 61/352,904, filed on Jun. 9, 2010.

(51) Int. Cl.
*H04R 25/00* (2006.01)
*G06F 17/00* (2006.01)

(52) U.S. Cl.
USPC .............................................. 700/94; 381/182

(58) Field of Classification Search
CPC ... G10L 25/18; G10L 25/51; G06F 17/30743; G06F 17/30772; G06F 17/30017; G06F 17/30598; G06F 17/30761
USPC ...................... 711/94; 381/182; 707/999.102, 707/E17.009; 704/238; 700/94
See application file for complete search history.

(56) References Cited

U.S. PATENT DOCUMENTS 3,919,479 A 11/1975 Moon et al.
4,843,562 A 6/1989 Kenyon et al.
5,019,899 A 5/1991 Boles et al.
5,210,820 A 5/1993 Kenyon
6,941,275 B1 9/2005 Swierczek
7,346,472 B1 3/2008 Moskowitz et al.
7,421,305 B2 * 9/2008 Burges et al. .................. 700/94

(Continued)

FOREIGN PATENT DOCUMENTS

EP 2083546 7/2009
WO 02/27600 4/2002

(Continued)

OTHER PUBLICATIONS

International Search Report and Written Opinion in application No. PCT/GB2011/051042 mailed Sep. 14, 2011.

(Continued)

*Primary Examiner* — Fan Tsang
*Assistant Examiner* — Eugene Zhao
(74) *Attorney, Agent, or Firm* — Meyertons, Hood, Kivlin, Kowert & Goetzel, P.C.

(57) ABSTRACT

Automatic recognition of sample media content is provided. A spectrogram is generated for successive time slices of audio signal. One or more sample hash vectors are generated for a time slice by calculating ratios of magnitudes of respective frequency bins from a column for the time slice. In a primary evaluation stage an exact match of bits of the sample hash vector is performed to entries in a look-up table to identify a group of one or more reference hash vectors. In a secondary evaluation stage a degree of similarity between the sample hash vector and each of the group of reference hash vectors is performed to identify any reference hash vectors that are candidates for matching the sample media content, each reference hash vector representing a time slice of reference media content.

20 Claims, 6 Drawing Sheets

(56) References Cited

U.S. PATENT DOCUMENTS

| | | | | |
|---|---|---|---|---|
| 7,516,074 | B2 * | 4/2009 | Bilobrov | 704/270 |
| 7,548,934 | B1 * | 6/2009 | Platt et al. | 1/1 |
| 7,660,700 | B2 | 2/2010 | Moskowitz et al. | |
| 7,949,494 | B2 | 5/2011 | Moskowitz et al. | |
| 8,214,175 | B2 | 7/2012 | Moskowitz et al. | |
| 2002/0161741 | A1 | 10/2002 | Wang et al. | |
| 2003/0086341 | A1 | 5/2003 | Wells | |
| 2003/0212613 | A1 | 11/2003 | Sarig | |
| 2006/0044957 | A1 | 3/2006 | Ellis | |
| 2006/0229878 | A1 | 10/2006 | Scheirer | |
| 2008/0091366 | A1 | 4/2008 | Wang | |
| 2009/0051487 | A1 | 2/2009 | Sarig et al. | |
| 2009/0083228 | A1 * | 3/2009 | Shatz et al. | 707/3 |
| 2009/0083281 | A1 | 3/2009 | Sarig et al. | |
| 2010/0017502 | A1 | 1/2010 | Cheng et al. | |
| 2012/0166435 | A1 * | 6/2012 | Graham et al. | 707/728 |

FOREIGN PATENT DOCUMENTS

| | | |
|---|---|---|
| WO | 02/011123 | 7/2002 |
| WO | 02/061652 | 8/2002 |
| WO | 03/091990 | 11/2003 |
| WO | 2004/046909 | 6/2004 |
| WO | 2005/079499 | 9/2005 |
| WO | 2006/028600 | 3/2006 |
| WO | 2008/042953 | 4/2008 |

OTHER PUBLICATIONS

Jaap Haitsma, et al: "A Highly Robust Audio Fingerprinting System;" Internet Citation, Oct. 17, 2002, XP002278848, Retrieved from the Internet: http://ismir2002.ismir.net/proceedings/02-FP04-2.pdf.

J. L. Flanagan, et al., "Phase Vocoder," The Bell System Technical Journal, Nov. 1966, pp. 1493-1509.

Alan V. Oppenheim, "Speech spectrograms using the fast Fourier transform," reprinted from IEEE Spectrum, vol. 7, No. 8, Aug. 1970, pp. 57-62.

Jont B. Allen, et al., "A Unified Approach to Short-Time Fourier Analysis and Synthesis," Proceedings of the IEEE, vol. 65, No. 11, Nov. 1977, pp. 1558-1564.

Steven B. Davis, et al., "Comparison of Parametric Representations for Monosyllabic Word Recognition in Continuously Spoken Sentences," IEEE Transactions on Acoustics, Speech, and Signal Processing, vol. ASSP-28, No. 4, Aug. 1980, pp. 357-366.

Robert C. Maher, "Fundamental frequency estimation of musical signals using a two-way mismatch procedure," Journal of Acoustical Society of America, 95 (4), Apr. 1994, pp. 2254-2263.

Pedro Cano, et al., "A Review of Algorithms for Audio Fingerprinting," IEEE Workshop on Multimedia Signal Processing, 2002, pp. 169-173.

J. A. Haitsma, "Audio Fingerprinting—A New Technology to Identify Music," Faculty of Electrical Engineering of the Eindhoven University of Technology: Section Design Technology for Electronic Systems (ICS/ES)—ICS-ES 801, Master's Thesis, Nat.Lab. Unclassified Report 2002/824, Aug. 2002, 36 pages.

Advanced Design Approach for Personalised Training. Interactive Tools, Cordis simple search, Feb. 1, 2000-Oct. 31, 2002, URL: http://cordis.europa.eu/search/index.cfm?fuseaction=proj.document&PJ_RCN=5410050, 3 pages. [Retrieved Dec. 4, 2012].

Dan Boneh and James Shaw, "Collusion-Secure Fingerprinting for Digital Data," Advances in Cryptology—CRYPTO '95, Proceedings from the 15th Annual International Cryptology Conference, Aug. 27-31, 1995, vol. 963, pp. 452-465.

P. Alshuth, et al., "IRIS—a system for image and video retrieval," Proceedings of the 1996 Conference of the Centre for Advanced Studies on Collaborative Research, 1996, p. 2.

E. Remias, et al., "Block-oriented image decomposition and retrieval in image database systems," Proceedings of International Workshop on Date of Conference Multimedia Database Management Systems, Aug. 14-16, 1996, pp. 85-92.

K. Curtis, et al., "A comprehensive image similarity retrieval system that utilizes multiple feature vectors in high dimensional space," Proceedings of 1997 International Conference on Information, Communications and Signal Processing, Sep. 9-12, 1997, vol. 1, pp. 180-184.

Shih-Fu Chang, et al., "A fully automated content-based video search engine supporting spatiotemporal queries," IEEE Transactions on Circuits and Systems for Video Technology, vol. 8, Issue 5, Sep. 1998, pp. 602-615.

S.R. Subramanya, et al., "Wavelet-based indexing of audio data in audio/multimedia databases," Proceedings International Workshop on Multi-Media Database Management Systems, Aug. 5-7, 1998, pp. 46-53.

R. Mohan, "Video sequence matching," Proceedings of the 1998 IEEE International Conference on Acoustics, Speech and Signal Processing, vol. 6, May 12-15, 1998, pp. 3697-3700.

Response to Extended European Search Report in Application No. 1018994.9 dated Jan. 25, 2011, mailed Oct. 24, 2011, 5 pages.

* cited by examiner

SYSTEM AND METHOD FOR MEDIA RECOGNITION

CROSS-REFERENCE TO RELATED APPLICATIONS

The present application is related to and claims the benefit of the effective filing date of U.S. application 61/352,904 entitled "System and Method for Media Recognition" and filed on 9 Jun. 2010.

TECHNICAL FIELD

The invention relates to audio recognition systems and methods for the automatic recognition of audio media content.

BACKGROUND

Various audio recognition systems and methods are known for processing an incoming audio stream (a 'programme') and searching an internal database of music and sound effects ('tracks') to identify uses of those tracks within the programme.

In the real world, music is often only one of the layers of audio of a programme. One of the challenges for audio recognition is to recognize the identity of music even in circumstances where there are other layers of audio such as sound effects, voiceover, ambience, etc. that occur simultaneously. Other distortions include equalisation (adjusting the relative overall amounts of treble and bass in a track), and change of tempo and/or pitch.

Some audio recognition techniques are based on directly carrying out a near-neighbour search on calculated hash values using a standard algorithm. Where the space being searched has a large number of dimensions, such standard algorithms do not perform very efficiently.

An article entitled "A Highly Robust Audio Fingerprinting System" by J. Haitsma et. al. of Philips Research, published in the Proceedings of the 3rd International Conference on Music Information Retrieval, 2002, describes a media fingerprinting system to compare multimedia objects. The article describes that fingerprints of a large number of multimedia objects, along with associated meta-data (e.g. name of artist, title and album) are stored in a database such that the fingerprints serve as an index to the meta-data. Unidentified multimedia content can then be identified by computing a fingerprint and using this to query the database. The article describes a two-phase search algorithm that is based on only performing full fingerprint comparisons at candidate positions pre-selected by a sub-fingerprint search. Candidate positions are located using a hash, or lookup, table having 32 bit sub-fingerprints as an entry. Every entry points to a list with pointers to the positions in the real fingerprint lists where the respective 32-bit sub-fingerprint are located.

However, there remains a need for an apparatus, system and method for more efficient and more reliable identification of audio media content.

SUMMARY

Aspects of the invention are defined in the claims.

In an example embodiment, automatic recognition of sample media content is provided. A spectrogram is generated for successive time slices of audio signal. One or more sample vectors are generated for a time slice by calculating ratios of magnitudes of respective frequency bins from a column for the time slice. In a primary evaluation stage (primary test stage) an exact match of bits of the sample vector is performed to entries in a hash table to identify a group of one or more reference vectors. In a secondary evaluation stage (secondary test stage) a degree of similarity between the sample vector and each of the group of reference vectors is performed to identify any reference vectors that are candidates for matching the sample media content, each reference vector representing a time slice of reference media content. The vectors can also be variously described as "hashes", "hash vectors", "signatures" or "fingerprints".

An embodiment of the invention can provide scalability and efficiency of operation. An embodiment of the invention can work efficiently and reliably with a very large database of reference tracks.

An embodiment of the invention can employ hashes with good discriminating power (a lot of 'entropy') so that a hash generated from programme audio tends not to match against too many hashes in the database. An embodiment of the invention can employ a large number of measurements from the spectrum of the audio signal. Each measurement can be in the form of a 2-bit binary number, for example, that is relatively robust to distortions. Sets of spectral hashes can be generated from these measurements that depend on restricted parts of the spectrum.

An embodiment of the invention uses a method that combines an exact match database search in a primary step with refinement steps using additional information stored in a variable depth tree structure. This gives an effect similar to that of a near-neighbour search but achieves increases in processing speed by orders of magnitude over a conventional near neighbour search. Exact match searches can be conducted efficiently in a computer and allow faster recognition to be performed. An embodiment enables accurate recognition in distorted environments when using very large source fingerprint databases with reduced processing requirements compared to prior approaches. An embodiment enables a signature (or fingerprint) corresponding to a moment in time to be created in such a way that the entropy of the part of the signature that participates in a simple exact match is carefully controlled, rather than using an approximate match without such careful control of the entropy of the signature. This can enable accuracy and scalability at much reduced processor cost.

Rather than taking a large number of measurements from a spectrogram, an example embodiment takes account of the differing strengths of various hashes by varying the number of bits from the hash that are required to match exactly. For example, only the first 27 bits of a strong hash may be matched exactly, whereas a larger number, for example the first 34 bits, may be matched for a weaker hash. An embodiment of the invention can use a variable depth tree structure to allow these match operations to be carried out efficiently.

An example embodiment can provide for accurate recognition in noisy environments and can do this even if the audio to be recognised is of very short duration (for example, less than three seconds, or less than two seconds or less than one second). An example embodiment can provide recognition against a very large database source of fingerprinted content (for example for in excess of one million songs). An example embodiment can be implemented on a conventional stand alone computer, or on a networked computer system. An example embodiment can significantly improve the quality of results of existing recognition systems and improve the costs of large-scale implementations of such systems.

BRIEF DESCRIPTION OF THE DRAWINGS

Embodiments are described hereinafter, by way of example only, with reference to the accompanying drawings.

DETAILED DESCRIPTION

An example embodiment of the invention provides an audio recognition system that processes an incoming audio stream (a 'programme') and searches an internal database of music and sound effects ('tracks') to identify uses of those tracks within the programme. One example of an output of an example embodiment can be in the form of a cue sheet that lists the sections of tracks used and where they occur in the programme.

One example embodiment can work with a database of, for example, ten million seconds of music. However, other embodiments are scalable to work with a much larger database, for example a database of a billion seconds of music, and are capable of recognising clips with a duration of the order of, for example, three seconds or less, for example one second, and can operate at a rate of around ten times real time on a conventional server computer when processing audio from a typical music radio station.

The following are definitions of some of the terms used in this document:

A "track" is a clip of audio to be recognised at some point later. All available tracks are processed and combined into a database.

A "programme" is a piece of audio to be recognised. A programme is assumed to include some tracks joined together and subjected to various distortions, interspersed with other material.

A "distortion" is something that happens to a track which makes up a programme. Examples of distortions are:

Noise: the mixing of random noise with the track;

Voice-over: the mixing of speech with the track;

Pitch: the changing of pitch while maintaining the underlying timing;

Tempo: the changing of timing while maintaining the pitch;

Speed: the changing of both pitch and tempo (for example, by playing a tape faster).

It is to be noted that pitch, tempo and speed are related and that any two can be combined to produce the third.

A "hash" is a small piece of information obtained from a specific part (time slice) of a track or programme, which is ideally unchanged by distortion.

Figure 1:
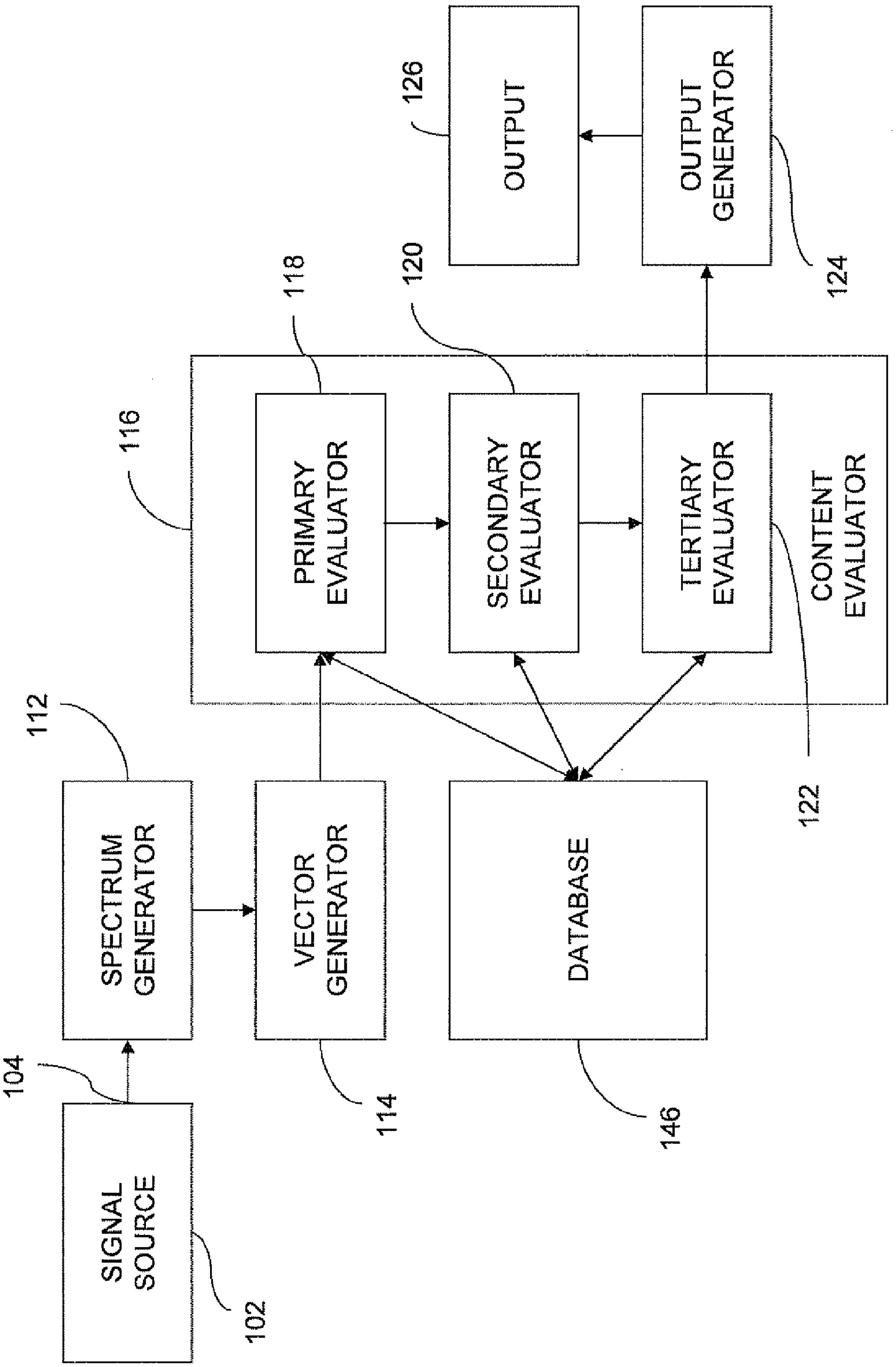
FIG. 1 is a schematic block diagram of an example apparatus.

FIG. 1 is a schematic block diagram of an example of an apparatus 110 forming an embodiment of the present invention.

A signal source 102 can be in the form of, for example, a microphone, a radio or internet programme receiver or the like for receiving a media programme, for example an audio programme, and providing a source signal 104.

A spectrogram generator 112 can be operable to generate a spectrogram from the source signal 104 by applying a Fourier transform to the source signal, the spectrogram including a plurality of columns, each column being representative of a time slice and including a plurality of frequency bins each representative of a respective range of frequency components for the time slice of the source signal;

A vector generator 114 can be operable to generate at least one source vector for a time slice of the source signal by calculating ratios of magnitudes of respective frequency bins from the column for the time slice and by quantising the ratios to generate digits of a source vector.

A database 46 includes reference vectors, each reference vector representing a time slice of reference media content.

A content evaluator 116 can include primary, secondary and tertiary evaluators 118, 120 and 122, respectively).

A primary evaluator 118 can be operable to perform a primary evaluation by performing an exact match of digits of source vectors to entries in a look-up table 66 of the database 46, wherein each entry in the look-up table is associated with a group of reference vectors and wherein the number of digits of the source vectors used to perform the exact match can differ between entries in the look-up table 66. The look-up table 66 can be organised as a variable depth tree leading to leaves, wherein each leaf forms an entry in the look-up table associated with a respective group of reference vectors. The number of digits leading to each leaf can be determined to provide substantially equally sized groups of reference vectors for each leaf. The number of digits leading to each leaf can form the number of digits of the source vector used to perform the exact match for a given leaf. Each leaf of the look-up table 66 can identify a group of reference vectors having d identical digits, wherein d corresponds to the depth of the tree to that leaf.

A secondary evaluator 120 can be operable to perform a secondary evaluation to determine a degree of similarity between a source vector and each of the group of reference vectors in the database 46 to identify any reference vectors that are candidates for matching the source media content to the reference media content. The secondary evaluator 120 can be operable to perform the secondary evaluation using a distance metric to determine the degree of similarity between the source vector and each of the reference vectors in the group of reference vectors.

A tertiary evaluator 122 can be operable to perform a tertiary evaluation for any reference vector identified as a candidate. The tertiary evaluator 122 can be operable to determine a degree of similarity between one or more further source vectors and one or more further reference vectors corresponding to the candidate reference vector identified in the secondary evaluation, wherein the further source vectors and the further reference vectors can each be separated in time from the source vector and the identified candidate reference vector.

An output generator 124 can be operable to generate an output record, for example a cue sheet, identifying the matched media content of the source signal.

Figure 2:
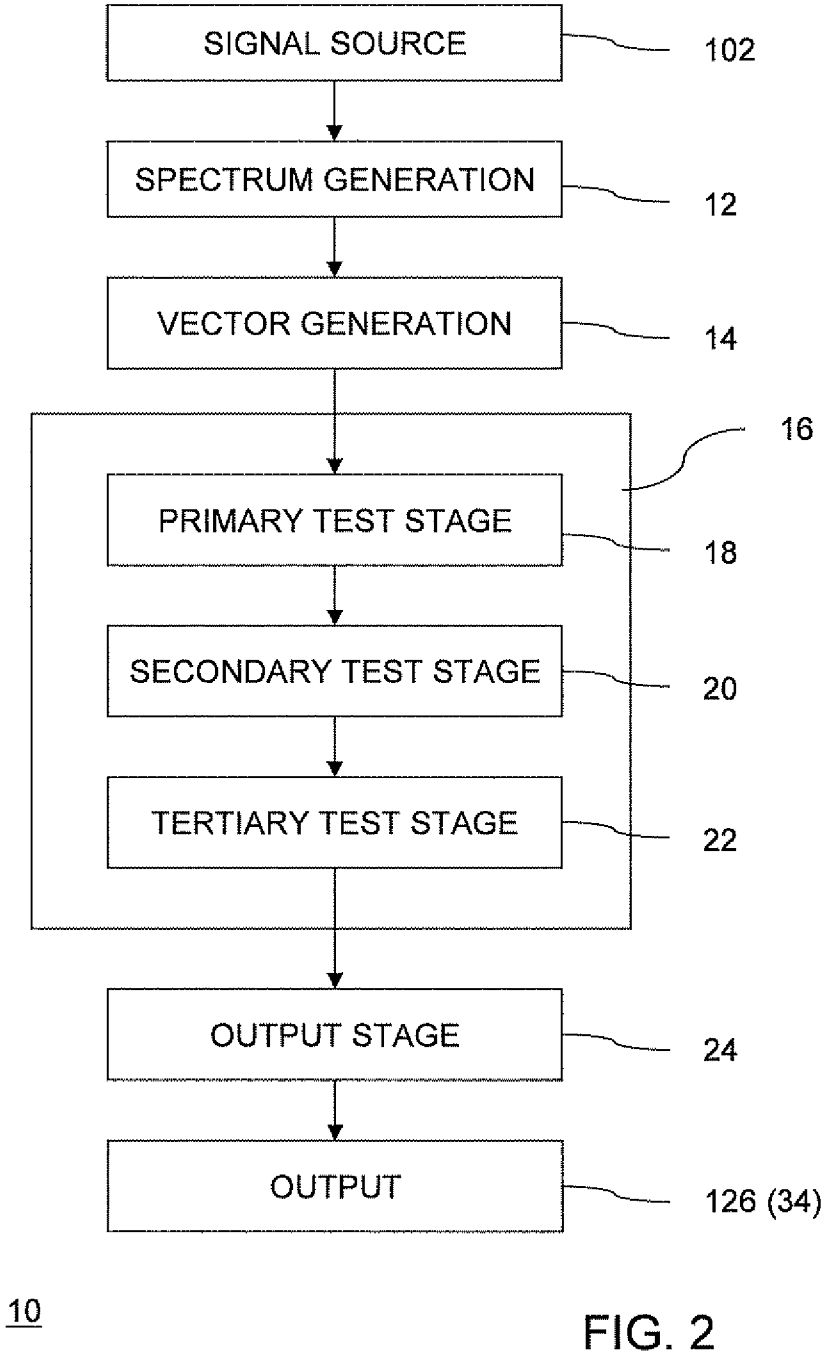
FIG. 2 is a flow diagram giving an overview of a method of processing audio signals.

FIG. 2 is a flow diagram 10 giving an overview of steps of a method of an example embodiment of the invention. The apparatus of FIG. 1 and the method of FIG. 2 can be implemented by one or more computer systems and by one or more computer program products operating on one or more computer systems. The computer program product(s) can be stored on any suitable computer readable media, for example computer disks, tapes, solid state storage, etc. In various examples, various of the stages of the process can be performed by separate computer programs and/or separate computer systems. For example, the generation of a spectrogram, as described below, can be performed by a computer program and/or computer system separate from one or more computer programs and/or computer systems used to perform hash generation and/or database testing and/or cue sheet generation. Furthermore, one or more of the parts of the apparatus of FIG. 1 or the process of FIG. 2 can be implemented using special purpose hardware, for example special purpose integrated circuits configured to provide the functionality described in more detail in the following description.

However, for reasons of ease of explanation only, it is assumed that the processes described in the following with reference to FIG. 2, which processes include spectrum generation 12, vector generation 14, signal evaluation 16 (including primary, secondary and tertiary stages 18, 20 and 22) and output generation 24 are performed by an apparatus comprising a computer server system including one or more processors and storage and controlled by one or more programs. The process steps described below, including the spectrum generation 12, vector generation 14, content evaluation 16 (including primary, secondary and tertiary stages 18, 20 and 22) and output generation 24 also correspond to functions performed by the spectrum generator 112, the vector generator 114, the content evaluator 116 (including those of the primary, secondary and tertiary evaluators 118, 120 and 122) and the output generator 124, respectively, of FIG. 1.

Spectrum Generation 12

In this example a source signal in the form of an audio signal is processed to generate a spectrogram, for example by applying a Fast Fourier Transform (FFT) to the audio signal.

In an example embodiment, the audio signal should be formatted in a manner consistent with a method of generating the database against which the audio signal is to be compared. In one example embodiment, the audio signal can be converted to a plain .WAV format, sampled at, for example, 12 kHz, in stereo if possible or mono if not and with, for example, 16 bits per sample. In one example embodiment, stereo audio comprising a left channel and a right channel is represented as sum (left plus right) and difference (left minus right) channels in order to give greater resilience to voice-over and similar distortions. The audio file is then processed to generate a spectrogram.

The parameters applied to the spectrogram are broadly based on the human ear's perception of sound since the kind of distortions that the sound is likely to go through are those which preserve a human's perception. The spectrogram includes a series of columns of information for successive sample intervals (time slices). Each time slice corresponds to, for example, 1 to 50 ms (for example approximately 20 ms). Successive segments can overlap by a substantial proportion of their length, for example by 90-99%, for example about 97%, of their length. As a result, the character of the sound tends to change only slowly from segment to segment. A column for a time slice can include a plurality of frequency bins arranged on a logarithmic scale, with each bin being, for example, approximately one semitone wide.

A substantial number of frequency bins can be provided for each time slice, or column, of the spectrum. For example of the order of 40 to a hundred or more frequency bins can be generated. In one specific example, 92 frequency bins are provided.

Vector Generation 14

A second step 14 is the generation of one or more hash vectors, or hashes. In an example embodiment, a number of different types of hashes are generated. One or more sequences of low-dimensional vectors forming the hashes (or 'fingerprints', 'signatures') are designed to be robust to the various types of distortions that may be encountered.

Figure 3:
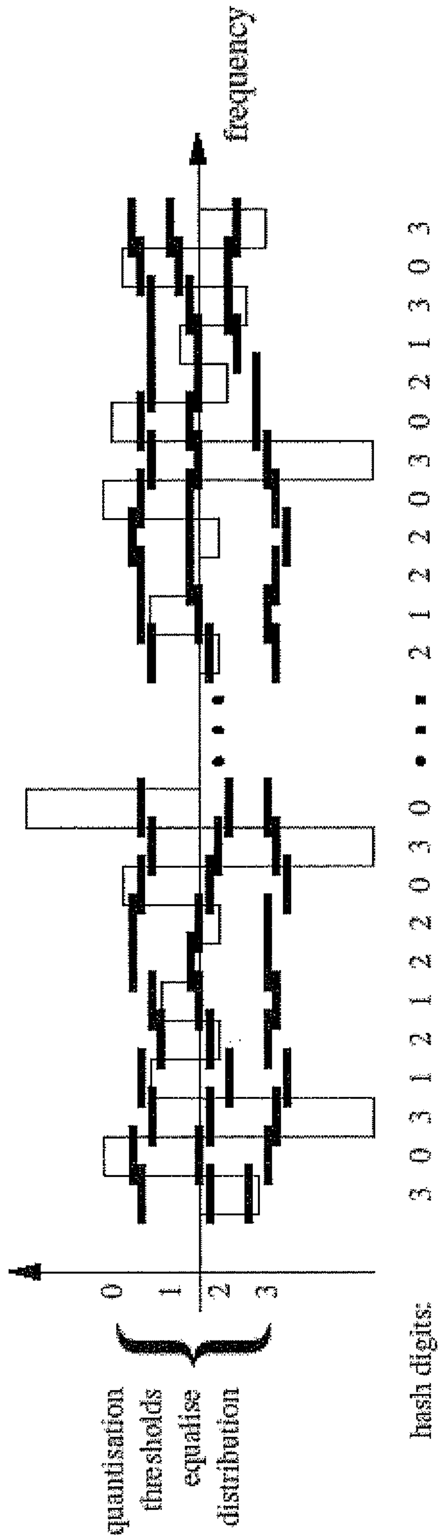
FIG. 3 is a schematic representation illustrating an example of setting quantisation levels at different frequencies.

In an example embodiment, in order to give resilience to added noise and similar signals, measured values can be coarsely quantised before generating a hash. There is conflict between a desire to quantise coarsely and a need to derive sufficient entropy from the source audio. In order to enhance the entropy obtained, the quantisation can be performed non-linearly such that for any given measurement the quantised values tend to be equally likely, making the distribution of hashes more uniform as shown in FIG. 3. Quantisation thresholds can be independently selected at each frequency to make the distribution of hashes more uniform. To maximise robustness, each measurement can be selected to depend on only two points in the spectrogram.

In an example embodiment, a basic hash is derived from a single column of the spectrogram by calculating the ratio of the magnitudes of adjacent or near-adjacent frequency bins. In one example, a vector can generated by determining a ratio of the content of adjacent frequency bins in the column and dividing the ratio into one of four ranges.

For example, for each of bins 0-91, determine a ratio as:

value of bin i/value of bin i+1 and determine within which of four ranges 00, 01, 10, and 11 the ratio falls.

In simplistic terms, consider that range 00 corresponds to ratios between 0 and 0.5, range 01 corresponds to ratios between 0.5 and 1, range 10 corresponds to ratios between 1 and 5 and range 11 corresponds to ratios between 5 and infinity. It can therefore be seen that, for each pair of bins compared, a two bit number can be generated. In another example, a different number ranges can be used to generate a different number of bits or one or more digits in accordance with a different base.

Such a vector can be substantially invariant with respect to overall amplitude changes in the original signal and robust with respect to equalisation (boost or cut of high or low frequencies). The ranges 00, 01, 10 and 11 can be different for each bin and can be obtained empirically by collecting values of the ratios from a test set of audio, and dividing the resulting distribution into four equal parts.

In an example embodiment, two hashes are then generated. One hash is generated using a frequency band from about 400 Hz to about 1100 Hz (a 'type 0 hash') and the other using a frequency band from about 1100 Hz to about 3000 Hz (a 'type 1 hash'). These relatively high frequency bands are more robust to the distortion caused by the addition of a voice-over to a track.

In an example embodiment a further hash type ('type 2 hash') is generated that is designed to be robust to pitch variation (such as happens when a sequence of audio samples is played back faster or slower than the nominal sample rate). A similar set of log frequency spectrogram bins to the basic hash is generated. The amplitude of each spectrogram bin is taken and a second Fourier transform is applied. This approach generates a set of coefficients akin to a 'log frequency cepstrum'. A pitch shift in the original audio will correspond to a translation in the log frequency spectrogram column, and hence (ignoring edge effects) to a phase shift in the resulting coefficients. The resulting coefficients are then processed to form a new vector whose nth element is obtained by taking the square of the nth coefficient divided by the product of the (n−1)th and (n+1)th coefficients. This quantity is invariant to phase shift in the coefficients, and hence also to pitch shift in the original signal. It is also invariant under change of volume in the original signal.

As successive segments overlap by a substantial proportion of their length, the character of the sound tends to change only slowly from segment to segment, whereby the hashes tend to change in only one or two bits, or digits, from segment to segment.

As these hashes all only inspect one column of the spectrogram, they are in principle invariant to tempo variation (time stretch or compression without pitch shift). As some tempo-changing algorithms can be found to cause some distortion of lower-frequency audio components, hashes based on higher-frequency components as described above are more robust.

An example embodiment can provide robustness with respect to voice over in programme audio. The general effect of the addition of voice-over to a track is to change a spectrogram in areas that tend to be localised in time and in frequency. Using hashes that depend only on a single column of the spectrogram, which corresponds to a very short section of audio, provides robustness with respect to voice over. This gives a good chance of recognising a track if the voice-over pauses even briefly (perhaps even in the middle of a word). Using hashes that are at least partially localised in frequency also helps to improve resilience to voice-over as well as certain other kinds of distortion.

Further, the fact that each hash depends on only on a very short section of audio gives the potential to recognise very short sections of a track.

Resilience to a transposition in pitch (with or without accompanying tempo change) can be achieved by generating hashes based on a modified cepstrum calculation.

Testing Stages (Content Evaluation) 16

In an example embodiment, the programme audio is then recognised by comparing the hashes against pre-calculated hashes of the tracks in a database. The aim of the look-up process is to perform an approximate look-up or 'nearest neighbour' search over the entire database of music, for example using the vector obtained from one column of the spectrogram. This is a high-dimensional search with a large number of possible target objects derived from the music database.

In an example embodiment, this is done as a multi-stage testing process 16.

Primary Test Stage (Primary Evaluation) 18

A primary test stage 18 is performed using an exact-match look-up. In an example embodiment, this is effected with the hashes as a simple binary vector with a small number of bits to perform a look up in a hash table. As a result of using a small number of bits, each look-up typically returns a large number of hits in the database. For reasons that will become clear later on, the set of hits in the database retrieved in response to the primary look-up for a given key is termed a 'leaf'.

In practice, the bits that are extracted from the spectrogram to construct the key are not independent and are not equally likely to be '0' or '1'. In other words, the entropy per bit of the vector (with respect to a given sample of music) is less than one.

The entropy per bit for some classes of vector is greater than that for others. Another way of saying this is that some keys are much more common than others. If therefore, a key of fixed size is used to access the database, a large number of hits will sometimes be found and sometimes a small number of hits will be found. If a key is chosen at random, the probability of it falling in a given leaf is proportional to the number of entries in that leaf and the amount of further work involved in checking each of those entries to determine if it really is a good match is also proportional to the number of entries in that leaf. As a result, the expected total amount of work to be done for that key is then proportional to the average of the squares of the leaf sizes. In view of this, in an embodiment, this value is minimised (i.e., system performance is maximised) by making the leaf sizes as equal as possible.

In an embodiment, therefore, a database structure is chosen that is aimed at equalising the sizes of the leaves.

Bits of a hash can be derived from continuous functions of the spectrogram if desired: for example, a continuous quantity can be quantised into one of eight different values and the result encoded in the hash as three bits. In such cases, it is advantageous not to use a uniform quantisation scheme but instead to choose (from example based on the analysis of a large sample of music) quantisation thresholds such that each possible quantised value tends to be equally likely to occur. The quantisation levels used when creating the database are the same as those used when creating hashes from the programme to be looked up in the database.

The bits in the hash can also be arranged so that those more likely to be robust (for example, the more significant bits of quantised continuous quantities) are placed towards the most significant end of the hash, and the less robust bits towards the least significant end of the hash.

In an embodiment, the database is arranged in the form of a binary tree. A depth in the tree corresponds to the position of a bit in the hash. The tree is traversed from bottom to top consuming one bit from the key hash (most significant, i.e., most robust, first) to determine whether the left or right child is selected at each point, until a terminal node (or 'leaf') is found, say at depth d. The leaf contains information about those tracks in the database that include a hash whose d most significant bits match those of the key hash.

The leaves are at various depths, the depths being chosen so that the leaves of the tree each contain the same order of number of entries, for example approximately the same number of entries. It should be noted that in other examples the tree could be based on another number base than a binary tree (for example a tertiary tree).

In the primary test stage, therefore, an exact match is looked for between the selected bits of the hash from the programme audio against stored hashes for reference tracks. The number of digits that are matched depend on the size of the database and of how common that hash is among tracks in general so that fewer bits are matched for rarer hashes. The number of bits that are matched can vary between, for example, 10 to about 30 bits in the case of a binary tree, depending on the size of the track database.

Further, as consecutive hashes of the same type typically change in only one or two bits, exact matches can generally also be obtained for the matched bits even if the time points in the programme at which hashes are generated are not exactly synchronised with the time points for which hashes were generated for the reference track database.

Secondary Test Stage (Secondary Evaluation) 20

In an embodiment, a secondary test stage 20 involves looking up a programme hash in the database by way of a random file access. This fetches the contents of a single leaf, containing a large number, typically a few hundred, for example of the order of 200 hash matches. Each match corresponds to a point in one of the original tracks that is superficially similar to the programme hash.

Each of these entries is accompanied by 'secondary test information', namely data containing further information derived from the spectrogram. Type 0 and type 1 hashes are accompanied by quantised spectrogram information from those parts of the spectrogram not involved in creating the original hash; type 2 hashes are accompanied by further bits derived from the cepstrum-style coefficients. The entries also include information enabling the location of an original track corresponding to a hash and the position in that track.

The purpose of the secondary test is to get a more statistically powerful idea of whether the programme samples and a database entry match, taking advantage of the fact that this stage of the process is no longer constrained to exact-match searching. In an example embodiment, a Manhattan distance metric or some other distance metric can be used to determine a degree of similarity between two vectors of secondary test information.

In an example embodiment, each secondary test that passes entails a further random file access to the database to obtain information for a tertiary test as described below. Bearing this in mind, in an example embodiment, a threshold for passing the secondary test is arranged such that on average about one of the database entries in a leaf passes the secondary test. In other words, the probability of passing a secondary test should be roughly the reciprocal of the leaf size.

Figure 4:
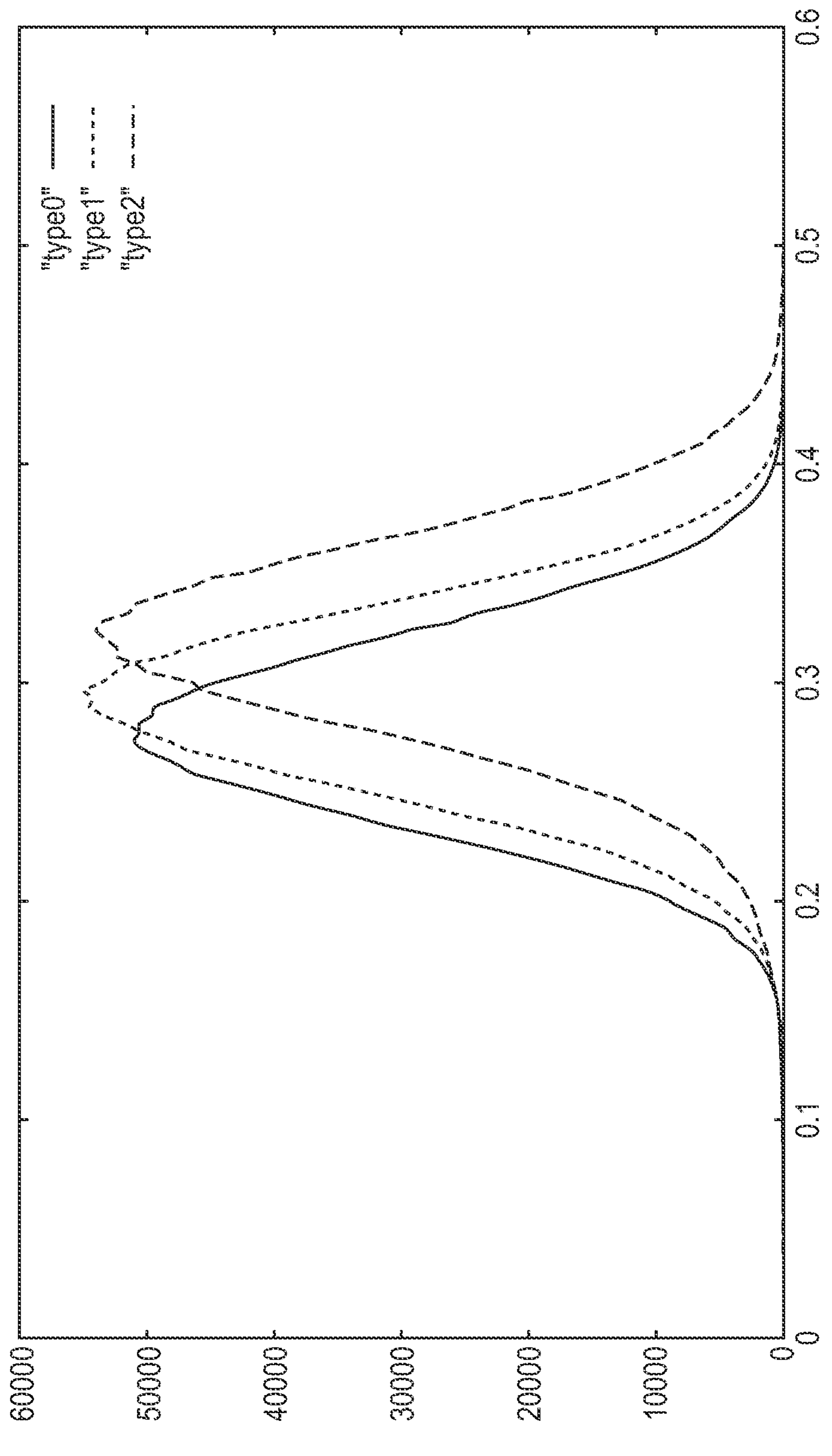
FIG. 4 is illustrates an example distribution of distances between test vectors.

FIG. 4 illustrates an example distribution of distances between two secondary test vectors selected at random from a large database of music, one curve for each of three types of hash. A threshold for a given type of secondary test is thereby chosen by choosing a point on the appropriate curve such that the area under the tail to the left of that point as a fraction of the total area under the curve is approximately equal to the reciprocal of the leaf size.

Thus, in the secondary test stage, each primary hit undergoes a 'secondary test' that involves comparing the hash information generated from the same segment of audio against the candidate track at the match point.

Tertiary Test Stage (Tertiary Evaluation) 22

As indicated above, the information stored in the leaf enables the location of an original track corresponding to the hash and the position in that track. When a secondary test is passed, tertiary test data corresponding to a short section of track around the match point is fetched. The tertiary test information includes a series of hashes of the original track. The programme hashes are then compared to the tertiary test data. This process is not constrained to exact-match searching, so that a distance metric, for example a Manhattan distance metric, can be used to determine how similar the programme hashes are to the tertiary test data. In an example embodiment, the metric involves a full probabilistic calculation based on empirically-determined probability tables to determine a degree of similarity between the programme hashes and the tertiary test data.

The sequence of programme hashes and the sequence of tertiary test hashes are both accompanied by time stamp information. Normally these should align: in other words, the programme hash time stamps should have a constant offset from the matching tertiary test time stamps. However, if the programme has been time-stretched (a 'tempo distortion') this offset will gradually drift. The greater the tempo distortion, the faster the drift. To detect this drift the tertiary test can be performed at a number of different trial tempos and the best result can be selected as the tempo estimate for the match. Since tempo distortions are relatively rare, in an example embodiment, this selection process is biased towards believing that no tempo distortion has occurred.

In the tertiary test, a scan backwards and forwards is performed from the match point evaluating the similarity of programme hashes and tertiary test hashes, and using the tempo estimate to determine the relative speed at which the scan is performed in the programme and tertiary test data. As long as good matches continue to occur at above a certain rate, this is taken as evidence that the programme contains the track over that period. When good matches are no longer seen, this is taken as evidence that the start or end of that use of the track has been found.

It is unlikely that the initial estimate of tempo is exact. During the scan, therefore, programme hashes slightly ahead of and slightly behind the nominal computed position are tested. If these match the tertiary test information better than the hashes at the nominal position, a correction is applied to the estimated tempo. The tracking of a small amounts of drift in tempo is thus accommodated.

As the hashes used in an example embodiment depend on a single column of the spectrogram, they are inherently resilient to a change in tempo. Efficiency is enhanced in that analysis or searching with regard to tempo changes is postponed until the tertiary test stage and at that stage there are only a few candidates to examine and so an exhaustive search over possible tempo offsets is computationally viable.

Accordingly, in the tertiary testing phase a second database is used that can contain a highly compressed version of the spectrograms of the original tracks. In an example embodiment the database is based on similar hashes to the primary database, with the addition of some extra side information. These data are arranged to be quickly accessible by track and by position within that track. The system can be arranged such that indexes fit within a computer's RAM. During the tertiary testing the programme audio on either side of a candidate match that has passed the secondary test is compared against the database using a full probabilistic calculation. This test is capable of rejecting false positives that have passed the secondary test, and simultaneously finds the start- and end-points within the programme where the track material is used.

In summary, each hash that passes the secondary test undergoes the tertiary test based on an alignment of the programme material and the track material implied by the secondary test stage. In the tertiary testing that alignment is extended backwards and forwards in time from the point where the primary hit occurred by comparing the programme and the candidate track using a database that contains hashes along with other information to allow an accurate comparison to be made. If the match cannot be extended satisfactorily in either direction it is discarded; otherwise the range of programme times over which a satisfactory match has been found is reported (as an 'in-point' and an 'out-point'), along with the identity of the matching track and the range of track times that have been matched. In one example embodiment, this forms one candidate entry on an output cue sheet.

Output Stage 22

As mentioned earlier, one application of the audio recognition process is the generation of a cue sheet. The result of the tertiary testing is a series of candidate matches of the programme material against tracks in the original database. Each match includes the programme start and end points, the identification number of the track, the start and end point within the track, and an overall measure of the quality of the match. If the quality of match is sufficiently high, then this match is a candidate for entry into the cue sheet.

When a new candidate cue sheet entry is found, it is compared against the entries already in the cue sheet. If there is not a significant overlap in programme time with an existing entry, it is added to the cue sheet. If there is a significant overlap with another entry then the entry is displaced if its match quality is higher, and otherwise the candidate will be discarded.

When all the programme hashes have been processed, a completed cue sheet can be output.

As indicated earlier, the process that has been described is performed automatically by one or more computer programs operating on one or more computer systems, and can be integrated into a single process that is performed in real time, or can be separated into one or more separate processes performed at different times by one or more computer programs operating on one or more different computer systems. Further details of system operation are described in the following passages.

Figure 5:
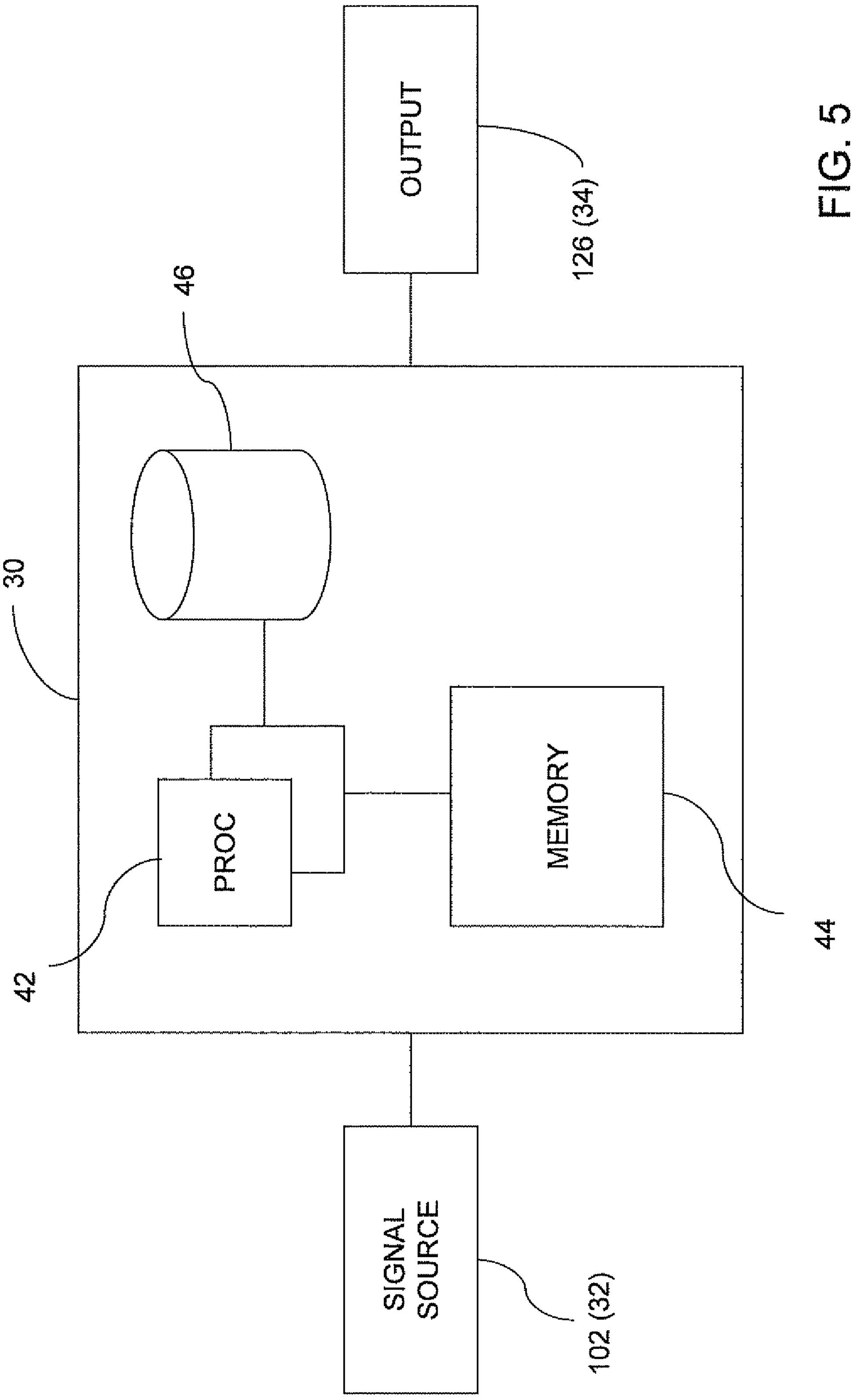
FIG. 5 is a schematic representation of a computer system for implementing an embodiment of the method of FIG. 2.

In the present example, the system as shown in FIG. 5 is assumed to be a computer server system 30 that receives as an input an audio programme 32 and outputs a cue sheet 34. The computer system includes one or more processors 42, random access memory (RAM) 44 for programs and data and a database 46, as well as other conventional features of a computer system, including input/output interfaces, power supplies, etc. which are not shown in FIG. 5.

The Reference Database 46

The database 46 is built from a collection of source music files in a number of stages.

In an example embodiment, the database is generated by the following processes:

1. Each source music file is converted to a plain .WAV format, sampled at, for example, 12 kHz, in stereo if possible, or mono if not, with, for example, 16 bits per sample. Stereo audio comprising a left channel and a right channel is converted to sum (left plus right) and difference (left minus right) channels.
2. A file (e.g., called srclist) is made containing a numbered list of the source file names. Each line of the file can contain a unique identifying number (a 'track ID' or 'segment ID'), followed by a space, followed by the file name.
3. Hashes are generated from the source music tracks to create a file (e.g., called rawseginfo) containing the hashes of the source tracks. An auxiliary file (e.g., called rawseginfo.aux) is generated that contains the track name information from srclist.
4. The hashes are sorted into track ID and time order.
5. The tertiary test data is generated and indexes are made into it to form a mapped rawseginfo file.
6. The mapped rawseginfo file is sorted in ascending order of hash value.
7. A first cluster index (see format description below) is generated.
8. An auxiliary data file (e.g., called auxdata) is generated, the auxiliary data file being used for displaying file names in cue sheet output.
9. The various files are then assembled into the database.

For an example embodiment of the system designed to work with a database of ten million seconds of audio, various system parameters to be discussed below are set as follows.

Maximum leaf size=400

First cluster depth=20

It should be noted, however, that these are examples of the system parameters only, and that different embodiments will employ different parameters. For example, for larger databases the first cluster depth could be increased to, for example, about 23 or 24 bits for one hundred million seconds of audio and about 26 or 27 bits for one billion seconds of audio. In the example described in more detail below, a first cluster depth of 24 bits is assumed.

In an example embodiment, in order to keep file sizes manageable, various data structures used are packed into bytes and bits for storage as part of the database.

Raw Hash

In an example embodiment, a raw hash is stored as six bytes, or 48 bits. The most significant bits are those used for the primary database look-up.

Database Leaves and Rawseginfo

Each leaf in the database contains a sequence of rawseginfo structures. A programme to be analysed is also converted to a sequence of rawseginfo structures before look-ups are done in the database.

Each rawseginfo structure holds a raw hash along with information about where it came from (its track ID and its position within that track, stored as four bytes each) and a 16-byte field of secondary test information.

When initially generated, position information is set to indicate the time of the hash relative to the start of the track, measured in units of approximately 20 milliseconds. During the database build procedure this value is replaced by a direct offset into the tertiary test data (the 'mapped' rawseginfo).

The rawseginfo data structures are stored sequentially in order of hash in a flat file structure called the BFF ('big flat file'). Each leaf is a contiguous subsection of the BFF consisting of precisely those rawseginfo data structures whose hashes have their first d ('depth') bits equal, where d is in each case chosen such that the number of rawseginfo data structures within the leaf is no greater than the applicable 'maximum leaf size' system parameter. The selection of the depth value can be performed by first dividing the BFF into leaves each with depth value set to the value of the 'first cluster depth' system parameter. Then any leaf with depth value d whose size exceeds the 'maximum leaf size' system parameter can be divided into two leaves, each with a depth value of d plus one; this division procedure being repeated until no leaves remain whose size exceeds the 'maximum leaf size' system parameter.

Figure 6:
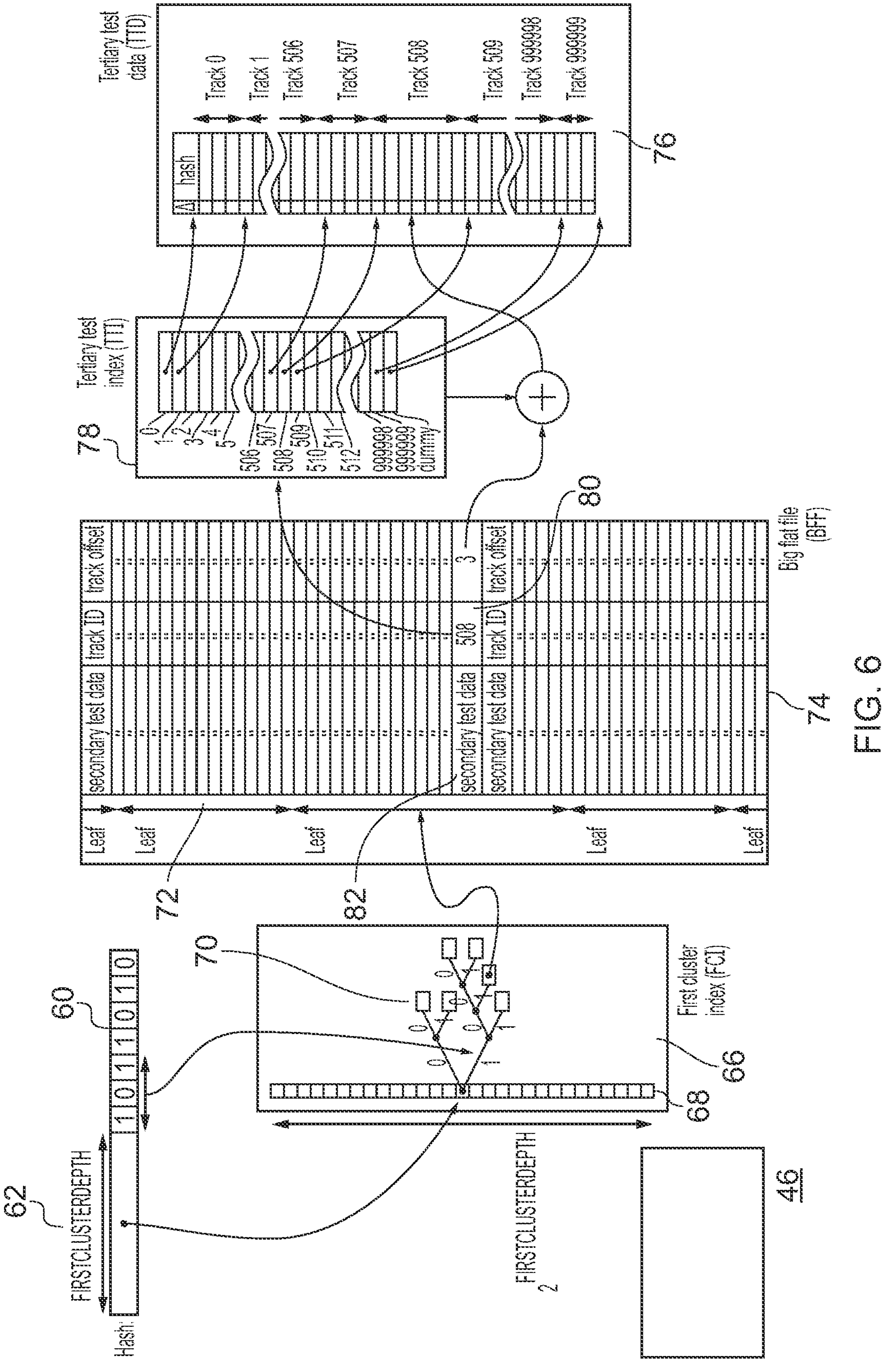
FIG. 6 illustrates a structure of database of the computer system of FIG. 5 in more detail.

FIG. 6 is a schematic diagram giving an overview of the structure of the database 46 and the look-ups associated with each hash derived from the programme audio.

There are two levels of index into the leaves of the database.

As discussed above, the database 46 takes the form of a binary tree of non-uniform depth.

To simplify indexing the database, each leaf has a depth of at least the first cluster depth parameter 62, say 24 bits. The part of the tree above a node at first cluster depth is known as a 'cluster'. There are $2^F$ clusters, where F=the first cluster depth, and each of these clusters corresponds to a contiguous section of the BFF 74, which in turn contains a number of leaves 72.

A programme hash 60 is shown at the top left of FIG. 6. A number of the most significant bits (set by a parameter FIRSTCLUSTERDEPTH 62) are used as an offset into a RAM-based index 66 (the 'first cluster index') which contains information about the shape of a variable-depth tree. The top level 68 of the database index 66 contains one entry per cluster. It simply points to a (variable-length) record 70 in the second index, which contains information about that cluster. Further bits are used from the programme hash to traverse the final few nodes of the tree formed by the second index. In the example illustrated, a further three bits ('101') are taken. Following the tree structure shown in FIG. 6, had the first of these bits been a zero, a total of only two bits would have been taken. The information stored in the RAM-based first cluster index is sufficient to find the corresponding database record for a leaf 72 directly.

Thus, the second level index describes the shape of the binary tree in a cluster and the sizes of the leaves within it. An entry consists of the following.

(i) An offset into the BFF 74 where the data for this cluster start.

(ii) An encoding of the shape of the binary tree in the cluster. This is a bit stream with one bit for each node (interior and leaf) of the tree, considered in the order encountered in a depth-first traversal of the tree. The bit is a zero if the node is interior, and 1 if it is a leaf. The bit stream is padded with 0 bits to the end of the last byte if necessary.

(iii) The size of each leaf 72 in the cluster, in the order encountered in a depth-first traversal of the tree, encoded in a compressed form such that most sizes are expressed in a single byte.

In the small number of cases where a cluster contains only hashes with little entropy (i.e., where the cluster is relatively large), a special flag value can replace (ii) and (iii) above, and the corresponding BFF entries are not indexed.

In an example embodiment, both levels of index 66/70 are designed to fit into RAM in the server system, allowing the contents of any database leaf to be fetched with a single random access to the BFF.

In the BFF, along with each matching hash, further information derived from the spectrogram is stored in a similar manner to that described earlier with respect to the programme hashes. Since only a few hundred matches are to be considered at the secondary test stage a distance metric can be used to determine whether there is indeed a good match between the programme and a reference track identified in the primary test stage. Evaluating such a metric over the whole database would be prohibitively expensive in computation time. As indicated earlier, the threshold for this test is set so that only a very small number of potential matches, perhaps as few as one or two, pass.

To further increase the value extracted from the single random database disk access the secondary test information can be compressed using an appropriate compression algorithm.

The tertiary test information consists of a sequence of tertiary test data 76 structures in order of track ID and time offset within that track. Each of these contains a time offset (in units of approximately 20 milliseconds) from the previous entry, stored as a single byte, and a raw hash.

The database 46 includes an index 78 into the tertiary test data 76 giving the start point of each track. This index is designed to be small enough to fit into RAM and therefore allow any desired item of tertiary test data to be fetched with a single random access to the database file. Data 80 defining an entry into the tertiary test data index 76 is provided with the secondary test data 82 in the BFF 74.

In order to reduce database access times, the database is advantageously held on solid state disks rather than a traditional hard disks, as the random access (or 'seek') times for a solid stage disk are typically of the order of a hundred times faster that a traditional hard disk. Where the database size allows, all the information can be stored in a computer's RAM. Further, as indicated, with a variable-depth tree structure as many bits of a hash can be taken as are required to reduce the number of secondary tests performed below a set threshold, for example, a few hundred.

Although particular example embodiments have been described above, modifications and additions are envisaged in other embodiments.

Hash Functions

For example, the hash functions can be adapted to provided various degrees of robustness, for example to choose the order of bits within the hash to maximise its robustness with respect to the exact-match database look-up. Other pitch shift invariant sources of entropy could be used with the full-scale database in addition to the cepstral-type hash coefficients.

Database Tree

In the above example, the database tree structure 70 is organised on a binary basis. However, in other examples, the number of children of a node could be a number other than two, and indeed, it could vary over the tree. This approach could be used to further facilitate equalising the sizes of the leaves. As an alternative, or in addition, a tree structure may be used where a hash can be stored for each of the children of a node, for example for both the left and the right children of a node in a binary tree (known as a 'spill tree').

Identification of Duplicate Tracks

Optionally, one could search the track database for duplicated sections of music. The unique sections (which we will call 'segments') would then be stored in the database and identified as described above; a subsequent processing stage will convert the list of recognised segments into a list of tracks. Such an approach would involve further pre-processing, but would reduce the storage requirements of the database and could accelerate real-time processing.

Absolute Time Information

In the above described embodiment, an absolute time for a tertiary test data entry is determined by scanning forward to it from the start of that segment, accumulating time deltas. Optionally, absolute time markers could be included in a sequence of tertiary test data entries.

Database Thinning

In order to reduce the size of the secondary test database, database thinning can be used. This involves computing a 'hash of a hash' to discard a fixed fraction of hashes in a deterministic fashion. For example, to thin the database by a factor of three, the following modifications can be employed. For each hash generated those bits which will need to be matched exactly in the database are considered as an integer. If this integer is not exactly divisible by three, the hash is discarded, that is it does not get included in the database built from the source track material. Likewise, if a hash that fails this criterion is encountered when processing programme material, it is known immediately that it will not be in the database and therefore no look up would be performed. A deterministic criterion that is a function of the bits involved in the exact match to accept or reject hashes is used rather than simply accepting or rejecting at random with a fixed probability, as the latter approach would have a much greater adverse effect on the hash hit rate, especially at greater thinning ratios.

Alternative Embodiments

The embodiments described above are by way of example only. Alternative embodiments can be envisaged within the spirit and scope of the claims.

For example, in the example embodiments described with respect to the Figures, the primary evaluation includes performing an exact match of digits of a source vector to entries in the look-up table, wherein each entry in the look-up table is associated with a group of reference vectors. The secondary evaluation then includes determining a degree of similarity between the source vector and each of the group of reference vectors to identify any reference vectors that are candidates for matching the source media content to the reference media content. The tertiary evaluation then involves determining a degree of similarity between one or more further source vectors and one or more further reference vectors, the further source vectors and the further reference vectors each being separated in time from the source vector and the candidate reference vector, respectively. The secondary and tertiary evaluations involve random accesses to the storage holding the database of reference vectors. It is to be noted that the database of reference vectors can be of a substantial size, for example of the order or larger than 10 terabytes.

Where the processing is performed using an apparatus that is formed by a stand-alone or networked computer system, for example a computer system with one or more processors and shared storage, it is advantageous that the database is held in solid state memory devices (SSDs) to increase the processing speed and therefore speed up the secondary and tertiary processing stages. However, such storage is currently expensive. Processing can be performed in this manner using slower, lower cost storage devices such as disk storage, but this can slow the recognition process, especially where the reference database is large.

Another alternative is to use an apparatus employing an array approach or a cloud approach to processing, where the processing tasks are distributed to multiple computer systems, for example operating as background tasks, with the results of the cloud processing being coordinated in a host computer system.

A further approach that is also envisaged in that a source database of source vectors is generated from a source programme and then reference media of a reference database is matched against the source database in a linear, or streamed manner. This has the advantage that a source database of source vectors of, for example, a day's programming from a radio station could be held in a few gigabytes of random access memory and then the reference database could be streamed from low cost storage, for example a disk or tape, and the process of comparison could be performed in a low cost batch manner. Accordingly, using such an approach, a source media database of source vectors for the source programme material (for example from one radio programme, or an appropriate period of programming (say one hour, a part or a whole of a day, etc.,) could be generated in the manner described for the reference media database of reference vectors of FIG. 6. The source vectors could be stored in random access memory sorted into order of increasing hash value, in a hash table, or in a database structure similar to the one described for the reference media database of reference vectors of FIG. 6. The reference vectors could then be compared to the source media database by sequentially streaming reference vectors from the reference media database (which is much quicker than random accesses in the case of a low cost storage such as disk or tape). This process could include a primary evaluation of performing an exact match of digits of each reference vector against entries in the source database table, wherein each entry in the source database table is associated with a group of source vectors. The secondary evaluation could then include determining a degree of similarity between the current reference vector and each of the groups of source vectors to identify any source vectors that are candidates for matching the source media content to the reference media content. The tertiary evaluation then could then involve determining a degree of similarity between one or more further source vectors and one or more further reference vectors, the further source vectors and the further reference vectors each being separated in time from the source vector and the candidate reference vector, respectively. The secondary evaluations would involve random accesses to the storage holding the database of source vectors, but as this is relatively small, it can be held in random access memory. The tertiary evaluations would involve accesses to the storage holding the database of source vectors and the database of reference vectors. In one embodiment the database of reference vectors is stored in natural order, that is, track by track and with the vectors stored in time order within each track. In this embodiment the lookups involved in the tertiary evaluations will relate to adjacent entries in the database and so sequential accesses can be used to storage to reduce access times. In an alternative embodiment the database of reference vectors is stored in order of increasing hash value for the purposes of performing secondary tests, and the set of candidates for tertiary evaluation would be collected and sorted by track number to allow sequential accesses to be used to storage for the purposes of performing tertiary tests.

An example apparatus has been described for providing automatic recognition of source media content from a source signal by comparison to reference media content. The example apparatus can include: a spectrogram generator operable to generate a spectrogram from the source signal by applying a Fourier transform to the source signal, the spectrogram including a plurality of columns, each column being representative of a time slice and including a plurality of frequency bins each representative of a respective range of frequency components for the time slice of the source signal; a vector generator operable to generate at least one source vector for a time slice of the source signal by calculating ratios of magnitudes of selected frequency bins from the column for the time slice and to quantise the ratios to generate digits of a source vector; a primary evaluator operable to perform a primary evaluation by performing an exact match of digits of first vectors to entries in a look-up table, wherein each entry in the look-up table is associated with a group of second vectors and wherein the number of digits of the first vectors used to perform the exact match differs between entries in the look-up table; a secondary evaluator operable to perform a secondary evaluation to determine a degree of similarity between the first vectors and each of the group of second vectors to identify any second vectors that are candidates for matching the source media content to the reference media content; and a database comprising the look-up table and the second vectors, wherein the first vectors are either source vectors or reference vectors and the second vectors are the other of the source vectors and the reference vectors, each reference vector representing a time slice of the reference media content.

An example automatic recognition method has been described for the automatic recognition source media content from a source signal by comparison to reference media content, The example method can include: generating a spectrogram from the source signal by applying a Fourier transform to the source signal, the spectrogram including a plurality of columns, each column being representative of a time slice and including a plurality of frequency bins each representative of a respective range of frequency components for the time slice of the source signal; generating at least one source vector for a time slice of the source signal by calculating ratios of magnitudes of selected frequency bins from the column for the time slice and quantising the ratios to generate digits of a source vector; performing a primary evaluation by exact matching of digits of first vectors to entries in a look-up table, wherein each entry in the look-up table is associated with a group of second vectors and wherein the number of digits of the first vectors used to perform the exact match differs between entries in the look-up table; and performing a secondary evaluation to determine a degree of similarity between the first vectors and each of the group of second vectors to identify any second vectors that are candidates for matching the source media content to the reference media content, wherein a database stores the look-up table and the second vectors and wherein the first vectors are either source vectors or reference vectors and the second vectors are the other of the source vectors and the reference vectors, each reference vector representing a time slice of the reference media content.

In an example method, generating at least one vector for a time slice can include: for at least one selected frequency bin of a time slice, calculating ratios of that bin and an adjacent or a near adjacent frequency bins from the column for the time slice; and dividing the ratios into ranges to generate at least one selected digit for each ratio.

In an example method, generating at least one vector for a time slice can include: for at least one selected frequency bin of a time slice, calculating ratios of that bin and an adjacent or near adjacent frequency bin from the column for the time slice; and dividing the ratios into ranges to generate two binary digits for each ratio.

In an example method, the ranges can differ between selected ratio bins to provide a substantially equal distribution of ratio values between ranges.

An example method can include generating a first source vector using frequency bins selected from a frequency band from 400 Hz to 1100 Hz and a second source vector using frequency bins selected from a frequency band from 1100 Hz to 3000 Hz.

An example method can include generating a further source vector for a time slice by: generating a further spectrogram from the first signal by applying a Fourier transform to the source signal, the further spectrogram including a plurality of columns, each column being representative of a time slice and including a plurality of frequency bins each representative of a respective range of frequency components for the time slice of the first signal; applying a further Fourier transform to the respective frequency bins from the column for the time slice to generate a respective set of coefficients; generating the further source vector such that, for a set of N coefficients in a column for a time slice, for each of elements 2 to N−1 of the further source vector, an nth element is formed by the square of the nth coefficient divided by the product of the (n−1)th coefficient and the (n+1)th coefficient and quantising the elements of the resulting vector to generate at least one digit for each element.

In an example method, the source signal can be an audio signal and the frequencies of the spectrogram bins can be allocated according to a logarithmic scale.

In an example method the look-up table can be organised as a variable depth tree leading to leaves, the table being indexed by the first vector; each leaf can form an entry in the look-up table associated with a respective group of second vectors; and the number of digits leading to each leaf can be determined to provide substantially equally sized groups of second vectors for each leaf.

In an example method the number of digits leading to each leaf can form the number of digits of the first vector used to perform the exact match for a given leaf.

In an example method each leaf of the look-up table can identify a group of second vectors having d matching digits, wherein d corresponds to the depth of the tree to that leaf.

An example method can include performing the secondary evaluation using a distance metric to determine the degree of similarity between the first vector and each of the group of second vectors.

An example method can include performing a tertiary evaluation for any second vector identified as a candidate, the tertiary evaluation including determining a degree of similarity between one or more further first vectors and one or more further second vectors corresponding to the candidate second vector identified in the secondary evaluation.

In an example method the further first vectors and the further second vectors can be separated in time from the first vector and the candidate second vector, respectively.

In an example method the source signal can be a received programme signal.

An example method can include generating a record of the matched media content of the programme signal.

An example method can include generating a cue sheet identifying the matched media content.

In an example method the second vectors can be the source vectors and the apparatus can be configured to generate the database from the source vectors.

A computer program product in the form of a machine readable medium carrying program instructions can be configured to cause one or more processors of one or more computer systems to perform an example method as described above.

Although particular examples and embodiments have been described herein, they are not intended to be limiting and other examples and embodiments within the spirit and scope of the claims will be apparent to those skilled in the art.

What is claimed is:

1. An apparatus for providing automatic recognition of source media content from a source signal by comparison to reference media content, the apparatus including:

one or more computer systems configured to implement:

a spectrogram generator operable to generate a spectrogram from the source signal by applying a Fourier transform to the source signal, the spectrogram including a plurality of columns, each column being representative of a time slice and including a plurality of frequency bins each representative of a respective range of frequency components for the time slice of the source signal;

a vector generator operable to generate a plurality of source vectors including at least one source vector for each of respective time slices of the source signal, said at least one source vector for a said time slice of the source signal being generated by calculating ratios of magnitudes of selected frequency bins from the column for said time slice and quantizing the ratios to generate digits of said source vector, wherein a plurality of reference vectors represent the reference media content including at least one reference vector for each of respective time slices of the reference media content;

a primary evaluator operable to perform a primary evaluation by performing an exact match of digits of first vectors to entries in a look-up table, wherein each entry in the look-up table is associated with a group of second vectors, wherein the number of digits of the first vectors used to perform the exact match differs between entries in the look-up table, and wherein the first vectors are one of the source vectors and the reference vectors, and the second vectors are the other of the source vectors and the reference vectors;

a secondary evaluator operable to perform a secondary evaluation to determine a degree of similarity between the first vectors and each of the group of second vectors to identify any second vectors that are candidates for matching the source media content to the reference media content; and a database comprising the look-up table and the second vectors.

2. The apparatus of claim 1, wherein, for generating said at least one source vector for a time slice, the vector generator is operable:

for at least one selected frequency bin of a time slice, to calculate ratios of that bin and an adjacent or a near adjacent frequency bin from the column for the time slice; and to divide the ratios into ranges to generate at least one selected digit for each ratio.

3. The apparatus of claim 2, wherein for generating said at least one source vector for a time slice, the vector generator is operable:

for at least one selected frequency bin of a time slice, to calculate ratios of that bin and an adjacent or near adjacent frequency bin from the column for the time slice; and to divide the ratios into ranges to generate two binary digits for each ratio.

4. The apparatus of claim 2, wherein:

the ranges differ between selected ratios to provide a substantially equal distribution of ratio values between ranges.

5. The apparatus of claim 2, wherein the vector generator is operable:

to generate a first source vector using frequency bins selected from a frequency band from 400 Hz to 1100 Hz and a second source vector using frequency bins selected from a frequency band from 1100 Hz to 3000 Hz.

6. The apparatus of claim 1, wherein, for generating a further source vector for a time slice:

the spectrogram generator is operable to generate a further spectrogram by applying a Fourier transform to the source signal, the further spectrogram including a plurality of columns, each column being representative of a time slice and including a plurality of frequency bins each representative of a respective range of frequency components for the time slice of the source signal and to apply a further Fourier transform to the respective frequency bins from the column for the time slice to generate a respective set of coefficients; and the vector generator is operable to generate the further source vector such that, for a set of N coefficients in a column for a time slice, for each of elements 2 to N−1 of the further source vector, an nth element is formed by the square of the nth coefficient divided by the product of the (n−1)th coefficient and the (n+1)th coefficient; and to quantise the elements of the resulting vector to generate at least one digit for each element.

7. The apparatus of claim 1, wherein the source signal is an audio signal and the frequencies of the spectrogram bins are allocated according to a logarithmic scale.

8. The apparatus of claim 1, wherein:

the look-up table is organised as a variable depth tree leading to leaves, the table being indexed by a first vector;

each leaf forms an entry in the look-up table associated with a respective group of second vectors;

the number of digits leading to each leaf is determined to provide substantially equally sized groups of second vectors for each leaf.

9. The apparatus of claim 8, wherein:

the number of digits leading to each leaf forms the number of digits of the first vector used to perform the exact match for a given leaf.

10. The apparatus of claim 8, wherein each leaf of the look-up table identifies a group of second vectors having d matching digits, wherein d corresponds to the depth of the tree to that leaf.

11. The apparatus of claim 1, wherein the secondary evaluator is operable to perform the secondary evaluation using a distance metric to determine the degree of similarity between the first vector and each of the group of second vectors.

12. The apparatus of claim 1, the one or more computer systems further configured to implement a tertiary evaluator for performing a tertiary evaluation for any second vector identified as a candidate, the tertiary evaluator being operable to determine a degree of similarity between one or more further first vectors and one or more further second vectors corresponding to the candidate second vector identified in the secondary evaluation.

13. The apparatus of claim 12, where the further first vectors and the further second vectors are separated in time from the first vector and the candidate second vector, respectively.

14. The apparatus of claim 1, wherein the source signal is a received programme signal.

15. The apparatus of claim 14, the one or more computer systems further configured to implement a record generator operable to generate a record of the matched media content of the programme signal.

16. The apparatus of claim 15, the one or more computer systems further configured to implement a cue sheet generator operable to generate a cue sheet identifying the matched media content.

17. The apparatus of claim 1, wherein the second vectors are the source vectors and the apparatus is configured to generate the database from the source vectors.

18. The apparatus of claim 1, wherein the one or more computer systems include at least one processor and storage and computer software operable to implement the spectrogram generator, the vector generator and the evaluators.

19. A computer-implemented recognition method for the automatic recognition of source media content from a source signal by comparison to reference media content, the method including:

generating a spectrogram from the source signal by applying a Fourier transform to the source signal, the spectrogram including a plurality of columns, each column being representative of a time slice and including a plurality of frequency bins each representative of a respective range of frequency components for the time slice of the source signal;

generating a plurality of source vectors including at least one source vector for each of respective time slices of the source signal, said at least one source vector for a said time slice of the source signal being generated by calculating ratios of magnitudes of selected frequency bins from the column for said time slice and quantizing the ratios to generate digits of said source vector, wherein a plurality of reference vectors represent the reference media content including at least one reference vector for each of respective time slices of the reference media content;

performing a primary evaluation by exact matching of digits of first vectors to entries in a look-up table, wherein each entry in the look-up table is associated with a group of second vectors, wherein the number of digits of the first vectors used to perform the exact match differs between entries in the look-up table, and wherein the first vectors are one of the source vectors and the reference vectors, and the second vectors are the other of the source vectors and the reference vectors; and performing a secondary evaluation to determine a degree of similarity between the first vectors and each of the group of second vectors to identify any second vectors that are candidates for matching the source media content to the reference media content, wherein a database stores the look-up table and the second vectors.

20. A non-transitory machine readable medium carrying program instructions configured to cause one or more processors of one or more computer systems to perform an automatic recognition method for the automatic recognition of source media content from a source signal by comparison to reference media content, the method including:

generating a spectrogram from the source signal by applying a Fourier transform to the source signal, the spectrogram including a plurality of columns, each column being representative of a time slice and including a plurality of frequency bins each representative of a respective range of frequency components for the time slice of the source signal;

generating a plurality of source vectors including at least one source vector for each of respective time slices of the source signal, said at least one source vector for a said time slice of the source signal being generated by calculating ratios of magnitudes of selected frequency bins from the column for said time slice and quantizing the ratios to generate digits of said source vector, wherein a plurality of reference vectors represent the reference media content including at least one reference vector for each of respective time slices of the reference media content;

performing a primary evaluation by exact matching of digits of first vectors to entries in a look-up table, wherein each entry in the look-up table is associated with a group of second vectors, wherein the number of digits of the first vectors used to perform the exact match differs between entries in the look-up table, and wherein the first vectors are one of the source vectors and the reference vectors, and the second vectors are the other of the source vectors and the reference vectors; and performing a secondary evaluation to determine a degree of similarity between the first vectors and each of the group of second vectors to identify any second vectors that are candidates for matching the source media content to the reference media content, wherein a database stores the look-up table and the second vectors.

* * * * *